INVENTOR.
Hans O. Schjolin

INVENTOR.
Hans O. Schjolin

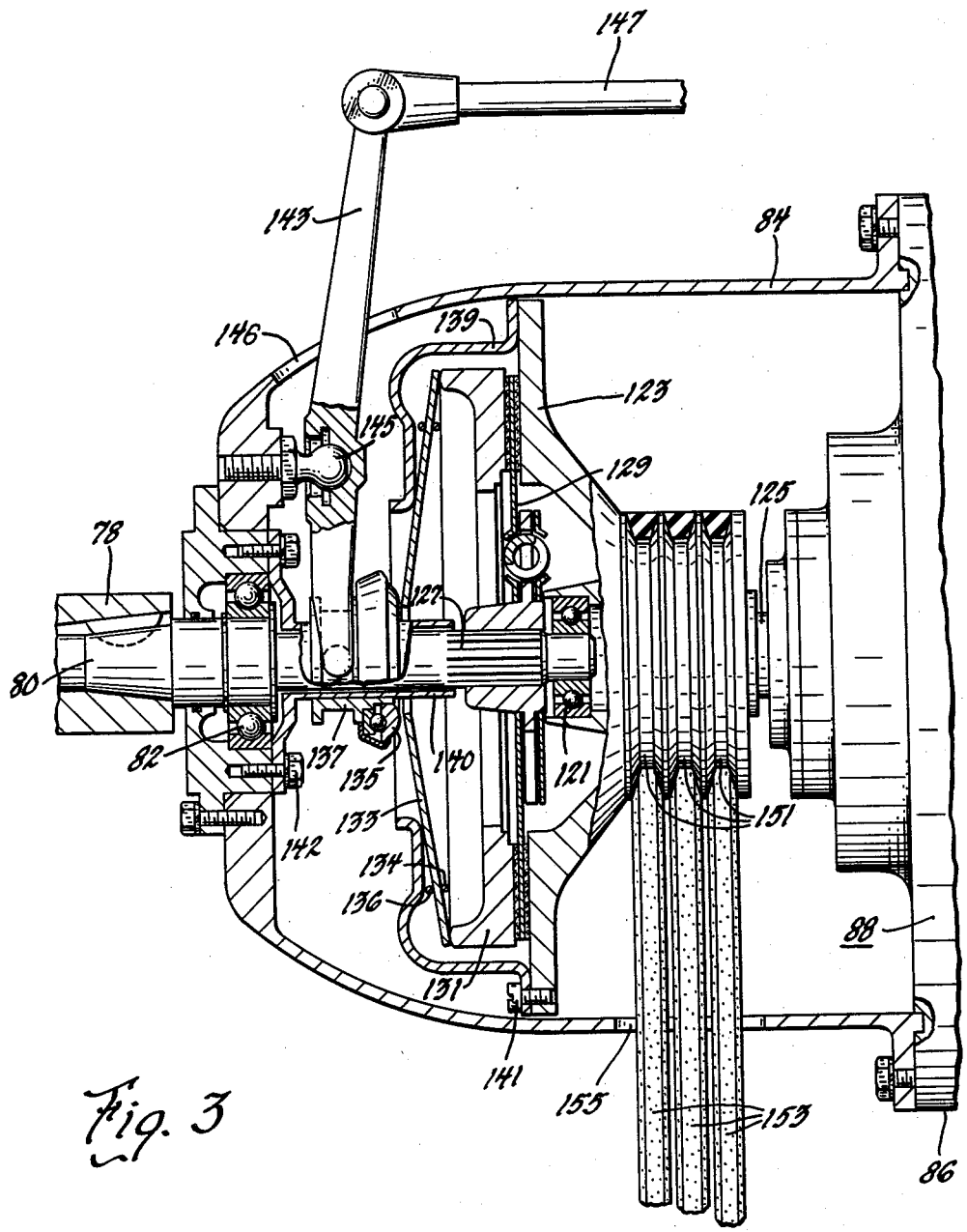

United States Patent Office 3,075,685
Patented Jan. 29, 1963

3,075,685
REFRIGERATING APPARATUS
Hans O. Schjolin, Birmingham, Mich., assignor to General Motors Corporation, Detroit, Mich., a corporation of Delaware
Filed Oct. 28, 1959, Ser. No. 849,210
1 Claim. (Cl. 230—38)

This invention pertains to refrigerating apparatus and more particularly to compressor driving arrangements in passenger vehicles and especially busses.

The air cooling of city busses is an especially difficult problem. It is required that the maximum passenger seating and space be provided while the vehicle size and weight is kept at a minimum. Frequent starts and stops and the opening and closing of the doors place heavy loads on the refrigerating system and its driving mechanism. The clutch must be able to operate for extended periods of time in the engaged position when refrigeration is required, such as during the summer, and also must operate for extended periods of time in the disengaged position throughout the winter months when no refrigeration is required. Previously, belt drives and special clutches without a throw-out bearing have been used but the initial cost was high and failures and maintenance costs have been undesirably high.

It is an object of this invention to provide an inexpensive durable driving arrangement for an air conditioning compressor of a bus which will be protected from the weather.

It is another object of this invention to provide an inexpensive durable driving and clutch arrangement for air conditioning compressors of a bus which will substantially be free from wear whether the compressor is operating or is disconnected.

It is another object of this invention to provide an inexpensive durable driving arrangement for an air conditioning compressor of a bus which employs an inexpensive automotive type clutch arranged in such a way that the throw-out bearing will not be under load and subject to wear either when the clutch is engaged or when the clutch is disengaged.

These and other objects are attained in the form shown in the drawings in which the fan end of the driving engine for the bus is provided with a bevel gear drive connecting through a propeller shaft to the disc of the clutch which is normally the driven disc but which in this compressor driving arrangement is the driving disc. This disc is located between the conventional pressure plate and the compressor fly-wheel member to which is attached the cover and which also carries a diaphragm spring. The throw-out fork and the throw-out bearing are mounted on the bell housing in such a way that the throw-out bearing is free of the diaphragm spring and the clutch when the clutch is engaged. When the throw-out fork and the throw-out bearing are operated to engage the diaphragm spring to disengage the clutch and stop the compressor, the diaphragm spring, the cover and the pressure plate and flywheel are stopped by the disengagement to prevent any wear upon the throw-out bearing.

Further objects and advantages of the present invention will be apparent from the following description, reference being had to the accompanying drawings wherein a preferred embodiment of the present invention is clearly shown.

In the drawings:

FIGURE 3 is a sectional view showing the clutch arrangement on the compressor.

Figure 1:
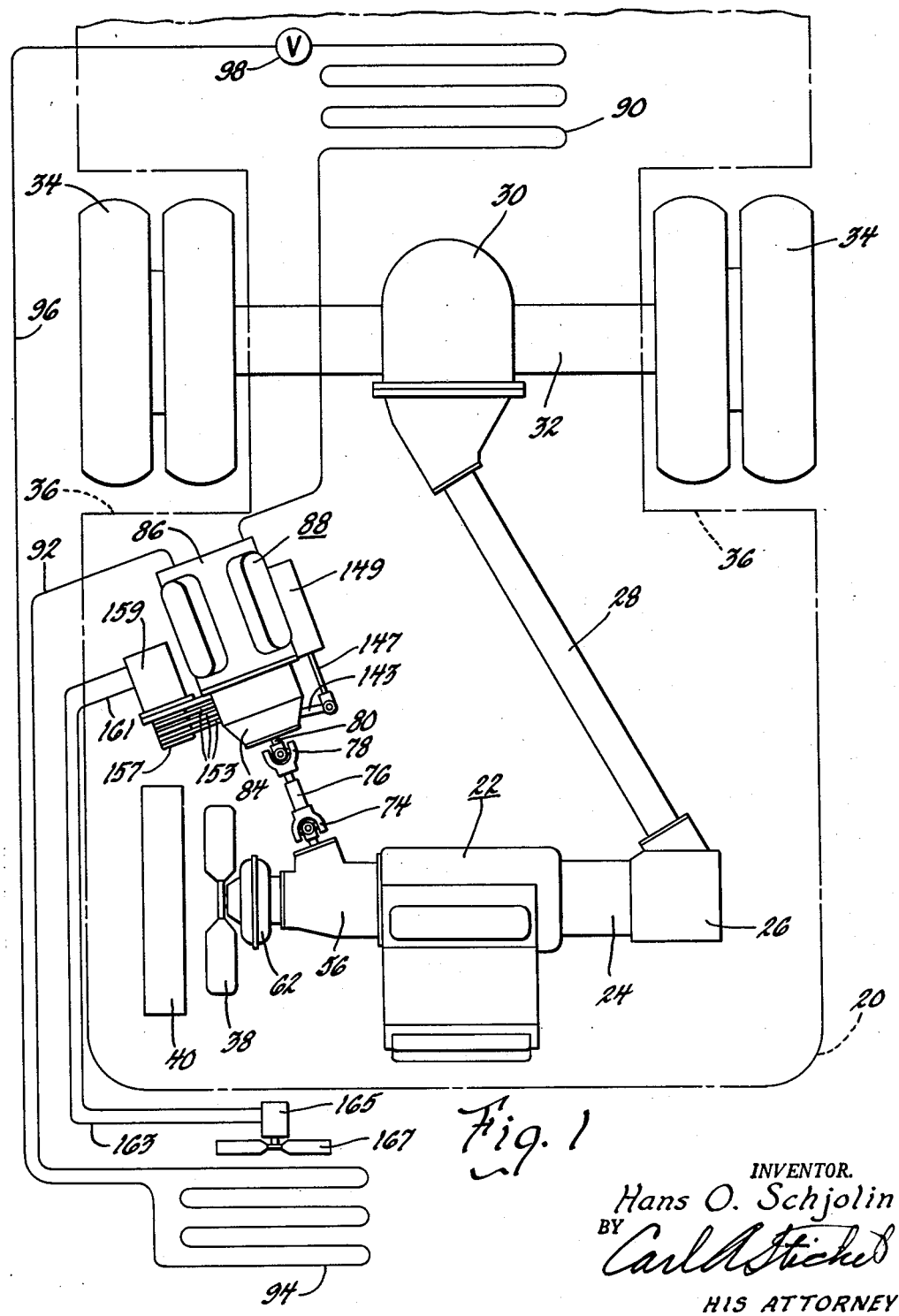
FIGURE 1 is a top view of the bus and compressor driving arrangement, together with a diagrammatic representation of the refrigerating system for air conditioning the bus.

Referring now more particularly to FIGURE 1, there is shown the outline 20 of the rear end of a city-type bus having a compact V-type internal-combustion driving engine 22, which may be either a diesel or gasoline type, having at the right end a clutch and transmission designated by the reference characters 24 and 26 and an angle propeller shaft drive arrangement 28 connecting with the bevel gear and differential 30 at the center of the rear axle 32. The rear axle may be provided with dual wheels 34 at the opposite ends. A wheel housing 36 surrounds each set of dual wheels.

Figure 2:
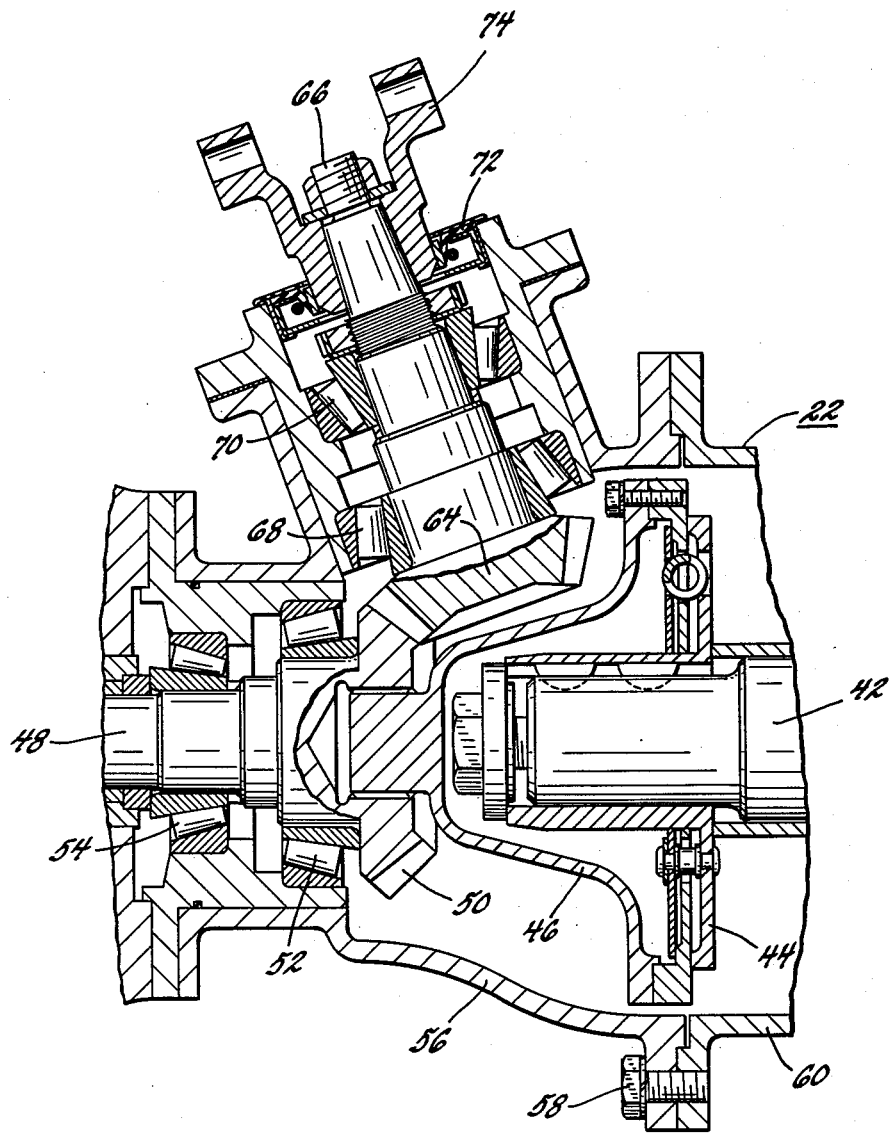
FIGURE 2 is a fragmentary top sectional view showing the bevel gear driving arrangement located between the engine and the fan for driving the compressor.

At the opposite end the engine 22 is provided with a radiator fan 38 for circulating air through the radiator 40 for cooling the engine 22. Between the fan 38 and the engine is the driving arrangement shown in FIGURE 2. The front end of the engine crankshaft 42 is connected to the vibration damper 44 to which is connected a housing 46 carrying a stub shaft 48 that is provided with a bevel pinion 50 adjacent the front end of the crankshaft 42. This stub shaft 48 and bevel pinion 50 are driven from the crankshaft 42 through the vibration damper 44 and the housing 46. The stub shaft 48 is supported on the bearings 52 and 54 in the housing 56 connected by the screws 58 to the adjacent end of the engine block 60. The opposite end of the stub shaft 48 connects to one element of the fluid coupling 62, the other element of which connects to the radiator fan 38.

The bevel pinion 50 meshes with a second bevel pinion 64 upon the adjacent end of a stub shaft 66. The stub shaft 66 is rotatably mounted in an arm of the housing 56 upon the bearings 68 and 70. The housing also contains a shaft seal 72 beyond which is a universal joint 74 connecting to the drive shaft 76 which may be provided with a conventional slip joint. The other end of the drive shaft 76 is provided with a second universal joint 78 connecting with a clutch shaft 80.

The clutch shaft 80 is rotatably mounted upon the ball bearing 82 within the bell housing 84 which is connected to the cylinder block 86 of the four cylinder compressor 88. The four cylinder compressor 88 preferably has two cylinders which are unloaded in two stages, with the remaining two cylinders always operative whenever the air compressor is operating. The compressor 88 pumps refrigerant from the evaporator 90 and compresses the refrigerant and forwards the compressed refrigerant through the conduit 92 to the condenser 94 where the compressed refrigerant is condensed and forwarded through the liquid conduit 96 under the control of a suitable expansion valve 98 to the evaporator 90. The cooling provided by the evaporator 90 is distributed to the passenger compartment of the bus 20.

A simple type of clutch normally requires some form of throw-out bearing. Such throw-out bearings normally will not withstand prolonged use. In automotive practice, the throw-out bearing only comes into operation during the time which the clutch is desengaged. This takes place normally only prior to and during shifting from one gear to another. Any other use, such as disengaging the clutch for coasting, is discouraged because of the possible damage to the clutch. This type of clutch is desirable in many ways and therefore must be used in such a way that the throw-out bearing will not be in use for prolonged periods. The problem of providing a clutch for an air conditioning compressor for busses is therefore rather difficult because the clutches must be engaged for prolonged periods during summer operation in which the compressor is needed throughout the hot weather, whereas during the cooler seasons of the year such as spring and fall and especially winter, the compressor is not needed and therefore must be declutched for prolonged periods throughout perhaps nine months of the year. There are also periods during which the compressor is required to operate only during the warmest parts of the day and is not needed mornings and evenings.

According to this invention, this difficulty is solved by providing that the throw-out bearing will be disengaged when the clutch is engaged during summer operation. During winter operation when the throw-out bearing must come into play and disengage the clutch, the arrangement is such that there is no relative rotation of the clutch throw-out bearing during this period since the clutch diaphragm spring, the clutch cover and the flywheel of the compressor do not rotate when the compressor does not operate. The compressor does not operate because the clutch is disengaged so that this relieves the throw-out bearing from any relative rotation and wear during the long period in which it is held in the disengaged position.

The front end or inner end of the clutch shaft 80 is rotatably mounted upon a ball bearing 121 in the flywheel member 123. This flywheel member 123 is connected to the drive shaft 125 of the compressor 88. The clutch shaft 80 is provided with splines 127 upon which the disc assembly 129 is slidably but non-rotatably mounted. This disc assembly is normally the driven disc in automotive practice but in this particular compressor drive arrangement it becomes the driving element and rotates whenever the driving engine 22 rotates. The periphery of the driving disc assembly 129 is located between the flywheel 123 and the pressure plate 131, which is in the form of a ring. The pressure plate 131 is held in engagement with the disc assembly 129 so that the disc assembly 129 is squeezed between the pressure plate 131 and the flywheel 123 in the engaged position. The pressure plate is forced toward the disc assembly 129 and the flywheel 123 by the diaphragm spring 133 which is pivotally mounted on the rings 134 and 136 supported by the cover 139 which is fastened by the screws 141 to the flywheel 123. The diaphragm 133 has a normal position unstressed as shown in FIGURE 3 in which its pivoting action on the rings 134, 136 forces its peripheral edges against the pressure plate to squeeze the outer portions of the disc assembly 129 between it and the flywheel 123.

The throw-out bearing 135 is mounted on the end of the throw-out sleeve 137 which is slidably mounted upon a stationary sleeve 140 fastened by the screws 142 to the bell housing 84. The clutch throw-out sleeve 137 is provided with a groove which receives the clutch throw-out fork 143 which is pivoted upon the ball joint 145 connected to the bell housing 84. The fork 143 has an arm extending through the opening 146 in the bell housing and is connected at its outer end to an actuating rod 147. This actuating rod 147 connects to an operating cylinder 149 mounted upon the side of the compressor. This cylinder 149 is preferably actuated by the compressed air system of the bus 20.

For summer operation, the cylinder 149 holds the actuating rod 147 in the position shown in FIGURE 3. In this position the clutch throw-out bearing 135 is free of the diaphragm spring 133 and the diaphragm spring 133 is free to exert its pressure upon the pressure plate to squeeze the disc assembly 129 between it and the flywheel 123 for driving the compressor drive shaft 125 to cause the compressor to provide refrigeration for the refrigerating system which includes the evaporator 90.

When refrigeration is not desired or required, the cylinder 149 will move the actuating rod 147 to the left to the position shown in FIGURE 1 causing the throw-out bearing 135 to engage and move the central portion of the diaphragm spring 133 to the right and the peripheral portion of the diaphragm spring 133 to the left, as shown in FIGURE 3, so as to relieve the pressure upon the plate 131 and to pull it away from the disc assembly 129 to stop the driving of not only the pressure plate 131 and the flywheel 123 but also the cover 139 and the diaphragm spring 133 and the compressor drive shaft 125. The clutch throw-out bearing 135 will remain in engagement with the diaphragm spring 133 but there will be substantially no relative rotation between the diaphragm spring 133 and the bell housing 84. The bearing 135 thereby will be protected from wear during the long period in which the clutch is disengaged.

The flywheel 123 is provided with three identical V-pulley grooves 151 which drive three identical V-belts 153 which extend through the aperture 155 in the bell housing 84 and connect with a three-groove V-belt pulley 157 mounted on the driving end of a hydraulic motor 159 which is supported by the cylinder block 86 of the compressor 88. The hydraulic motor 159 is connected by supply and return conduits 161, 163 with a constant-speed hydraulic motor 165 which drives the condenser fan 167 at a constant speed to circulate air over and through the refrigerant condenser 94 whenever the compressor 88 operates. By this arrangement, the condenser fan 167 is stopped whenever the compressor 88 is stopped, preventing any waste of power.

The substitution of a propeller shaft and enclosed gearing for driving the compressor increases the reliability and lowers the cost of the installation and particularly prevents the driving mechanism from being exposed to the weather and the splashing of water and slush which may be contaminated with salt and cinders under snowy conditions. The clutch is simple and inexpensive and requires little maintenance and operates for long periods of time without attention. The bell housing 84 prevents the clutch from being contaminated by slush and water and its bearings are also protected against contamination. This provides a form of drive arrangement which is less in first cost and also less in repair and maintenance costs than the previous arrangements. It can be readily located beneath the floor of the bus 20 at the rear end behind the rear wheels so that it does not obstruct the passenger space or limit the passenger space of the vehicle in any way. This makes it possible to further extend the use of air conditioning in city busses to recover patronage which has been lost largely to private transportation.

While the embodiment of the present invention as herein disclosed, constitutes a preferred form, it is to be understood that other forms might be adopted.

What is claimed is as follows:

In a passenger vehicle, a driving engine having at one end a vehicle driving arrangement and having at the opposite end a fan driving arrangement, a compressor provided at one end with a drive shaft and an integral clutch housing containing means providing a clutch face and a pressure plate and spring assembly mounted upon and connected to said drive shaft and a disc and facing assembly located between said clutch face and pressure plate, a clutch shaft rotatably mounted in said clutch housing operatively connected to said disc and facing assembly, bevel gearing and drive shaft means connecting said fan driving arrangement and said clutch shaft to rotate said clutch shaft whenever said driving engine operates, a clutch throw-out bearing slidably mounted in said clutch housing normally out of engagement with said pressure plate and spring assembly, said spring assembly including means for urging said clutch face and said pressure plate toward each other to grip said facing assembly between them when said clutch throw-out bearing is out of engagement with said spring assembly, a clutch disengaging fork operatively connected to said throw-out bearing and pivotally mounted on said clutch housing and extending through and outside said clutch housing, and operating means outside of said clutch housing connected to the portion of said fork outside the clutch housing for moving said throw-out bearing into operative engagement with said pressure plate and spring assembly to stop the rotation of said means forming said clutch face and said pressure plate and spring assembly and said compressor drive shaft and wear of said throwout bearing.

References Cited in the file of this patent

UNITED STATES PATENTS

| | | | |
|---|---|---|---|
| 797,790 | Caffall | Aug. 22, | 1905 |
| 1,183,859 | Estle | May 23, | 1916 |
| 1,299,478 | Kendall | Apr. 8, | 1919 |
| 1,342,487 | Wolfe | June 8, | 1920 |
| 1,481,816 | Tracy | Jan. 29, | 1924 |
| 1,536,264 | Pardee | May 5, | 1925 |
| 1,732,717 | Faudi | Oct. 22, | 1929 |
| 2,073,146 | Gardiner | Mar. 9, | 1937 |
| 2,092,104 | Bowden | Sept. 7, | 1937 |
| 2,185,667 | Hines | Jan. 2, | 1940 |
| 2,199,090 | Palmer | Apr. 30, | 1940 |
| 2,399,886 | Odevseff | May 7, | 1946 |
| 2,406,486 | Bonham | Aug. 27, | 1946 |
| 2,449,888 | Edwards | Sept. 21, | 1948 |
| 2,682,928 | Dean et al. | July 6, | 1954 |
| 2,725,185 | Willcox | Nov. 29, | 1955 |
| 2,810,269 | Schjolin | Oct. 22, | 1957 |
| 2,895,308 | Alward | July 21, | 1959 |
| 2,902,127 | Hardy | Sept. 1, | 1959 |
| 2,902,205 | Parker | Sept. 1, | 1959 |
| 2,918,805 | Schjolin | Dec. 29, | 1959 |
| 2,957,317 | Parker | Oct. 25, | 1960 |

FOREIGN PATENTS

| | | | |
|---|---|---|---|
| 117,135 | Australia | July 1, | 1943 |
| 332,234 | Germany | Jan. 15, | 1920 |
| 435,714 | France | Jan. 5, | 1912 |